(12) United States Patent
Higashikozono et al.

(10) Patent No.: US 6,655,987 B2
(45) Date of Patent: Dec. 2, 2003

(54) TERMINAL BOX APPARATUS FOR SOLAR CELL MODULE

(75) Inventors: Makoto Higashikozono, Yokkaichi (JP); Hiroyuki Yoshikawa, Yokkaichi (JP)

(73) Assignee: Sumitomo Wiring Systems, Ltd., Mei (JP)

( * ) Notice: Subject to any disclaimer, the term of this patent is extended or adjusted under 35 U.S.C. 154(b) by 0 days.

(21) Appl. No.: 10/355,300

(22) Filed: Jan. 31, 2003

(65) Prior Publication Data

US 2003/0193322 A1 Oct. 16, 2003

(30) Foreign Application Priority Data

Apr. 10, 2002 (JP) ........................................ 2002-108077

(51) Int. Cl.⁷ .............................................. H01R 13/66
(52) U.S. Cl. ..................................................... 439/535
(58) Field of Search ................................ 439/535, 372, 439/534, 571, 492, 523, 524, 271; 174/50, 52.1, 59, 58; 136/244, 256, 251, 293, 291; 323/906, 221

(56) References Cited

U.S. PATENT DOCUMENTS 4,460,232 A * 7/1984 Sotolongo .................... 439/535
6,344,612 B1 * 2/2002 Kuwahara et al. ............. 174/50
6,515,215 B1 * 2/2003 Mimura ....................... 136/244

FOREIGN PATENT DOCUMENTS

JP    A 11-135169    5/1999

* cited by examiner

Primary Examiner—Rajnikant B. Patel
(74) Attorney, Agent, or Firm—Oliff & Berridge, PLC (57) ABSTRACT

A terminal box apparatus includes a box; a plurality of connection terminals connected to a plurality of lead frames extending from photoelectric conversion elements of the a solar cell module; a pair of output take-out module connection cables; and a plurality of bypass diodes extending across the adjacent connection terminals respectively. Each of the bypass diodes has a bare chip diode and a pair of parallel lead plates disposed on an upper and lower surfaces of the bare chip diode and extended in opposite directions. Each of the lead plates has wide heat radiation parts respectively at an extended side thereof. Each of the heat radiation parts is soldered to heat radiation part receiving pieces projected from each of the connection terminals in a layered state.

12 Claims, 8 Drawing Sheets

TERMINAL BOX APPARATUS FOR SOLAR CELL MODULE

BACKGROUND OF THE INVENTION

1. Field of Invention

The present invention relates to a terminal box apparatus for use in a solar cell module disposed on a roof of a house or the like. The present application claims priority to Japanese Application No. 2002-108077, filed on Apr. 10, 2002.

2. Description of Related Art

A solar-electric system for generating electricity by utilizing sunbeams by mounting a plurality of solar cell modules in the shape of a matrix on the roof of a house is known. In the solar-electric system, each solar cell module has a connection terminal box apparatus for connecting the solar cell module to other solar cell modules.

Figure 15:
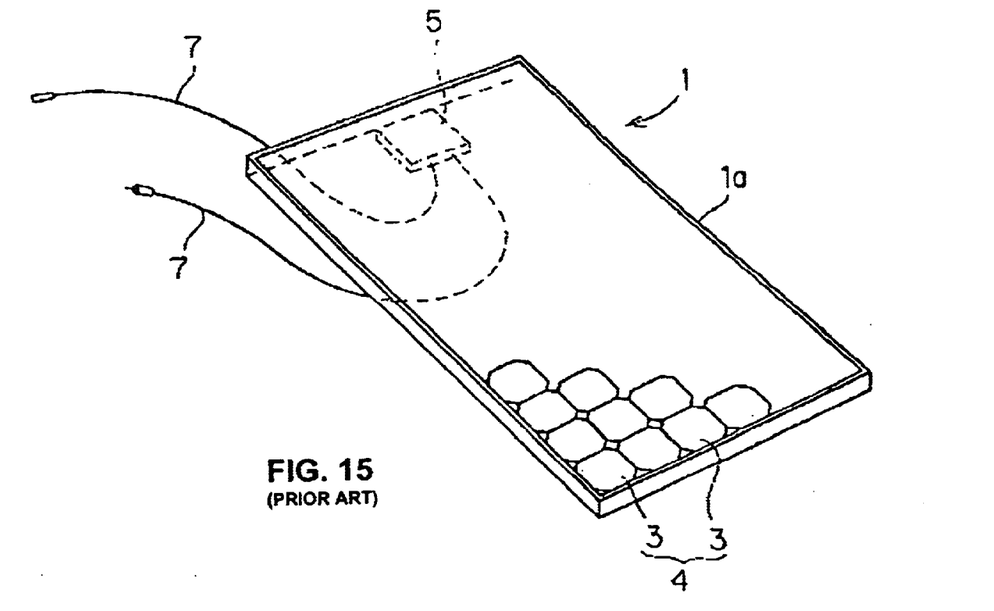
FIG. 15 is a schematic view showing the conventional construction of a solar cell module.

FIG. 15 shows a schematic construction of a conventional solar cell module 1. The solar cell module 1 has a large number of solar cells 3 (group 4 of cells) arranged oil a surface thereof, with the solar cells 3 electrically connected in series.

Figure 17:
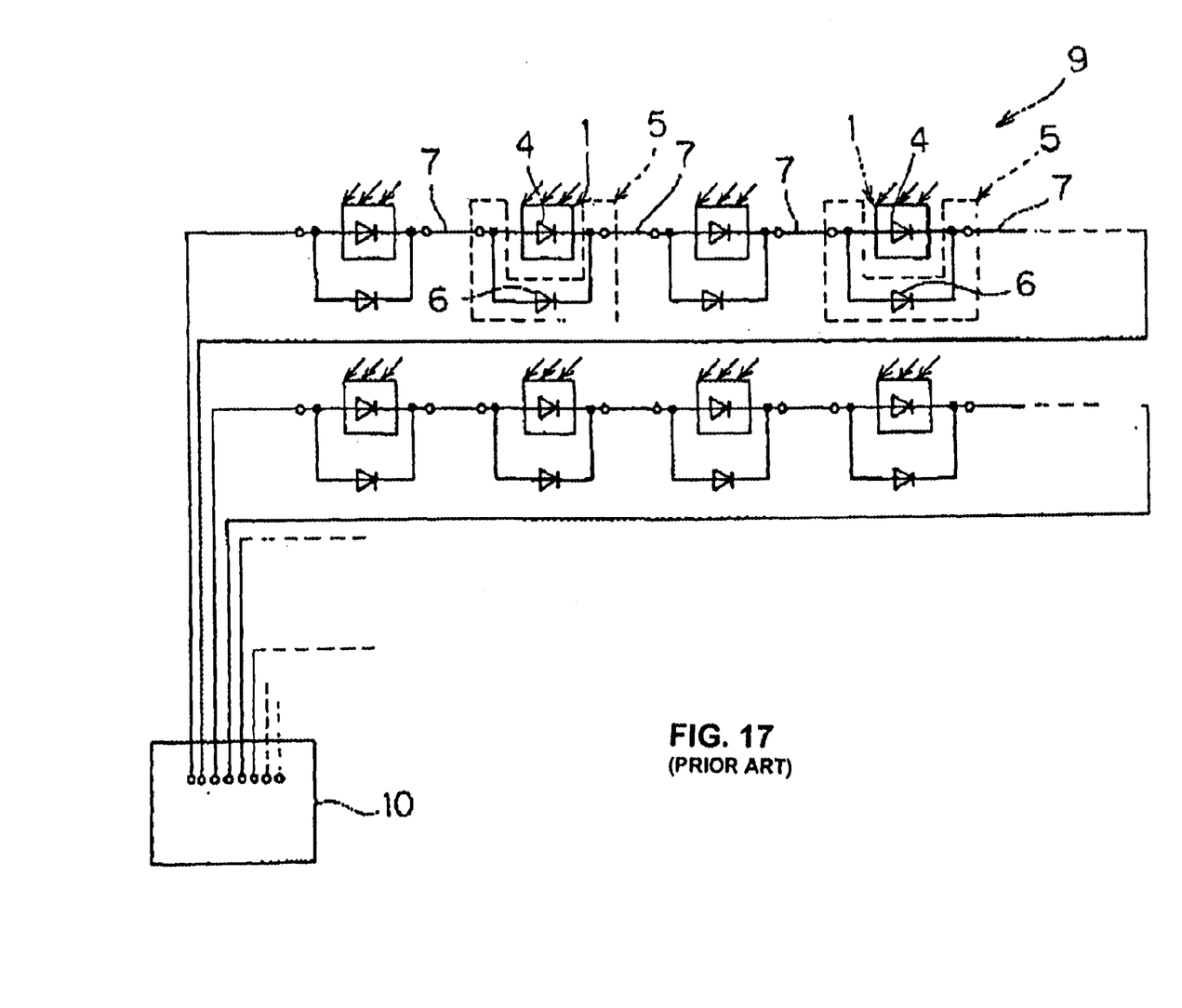
FIG. 17 is a block diagram showing a conventional solar-electric system.

A terminal box apparatus 5 is disposed on a rear surface of a body 1 a of the solar cell module 1. As shown in FIG. 17, the terminal box apparatus 5 accommodates bypass diodes 6 serving as a bypass rectifying element. The bypass diodes 6 are connected in a direction reverse to parallel output voltages of the group 4 of cells to bypass the electric current of the inversely biased group 4 (or module 1) of the cells.

Figure 16:
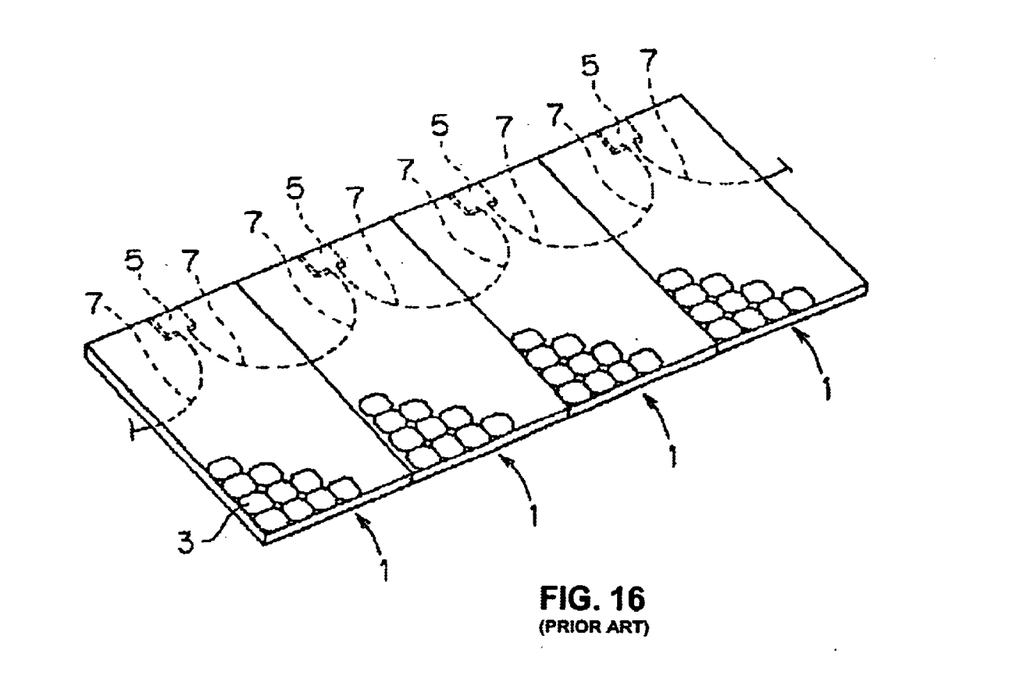
FIG. 16 shows a state in which a conventional plurality of solar cell modules is connected sequentially.

As shown in FIG. 16, one of two module connection cables 7 taken out of the terminal box apparatus 5 installed on the rear surface of the solar cell module 1 can be connected to the other of the two module connection cables 7 of the other solar cell module 1. A plurality of the solar cell modules 1 arranged in parallel on a roof or the like can connected sequentially in series.

In taking out an electric power from each solar cell module 1, as shown with the block diagram of FIG. 17, the solar cell modules 1 are electrically connected to construct a solar-electric system 9, and a plurality of the solar cell modules 1 connected sequentially in series is connected to an inverter or a connection box 10 to convert a direct current into an alternating current.

Figure 18:
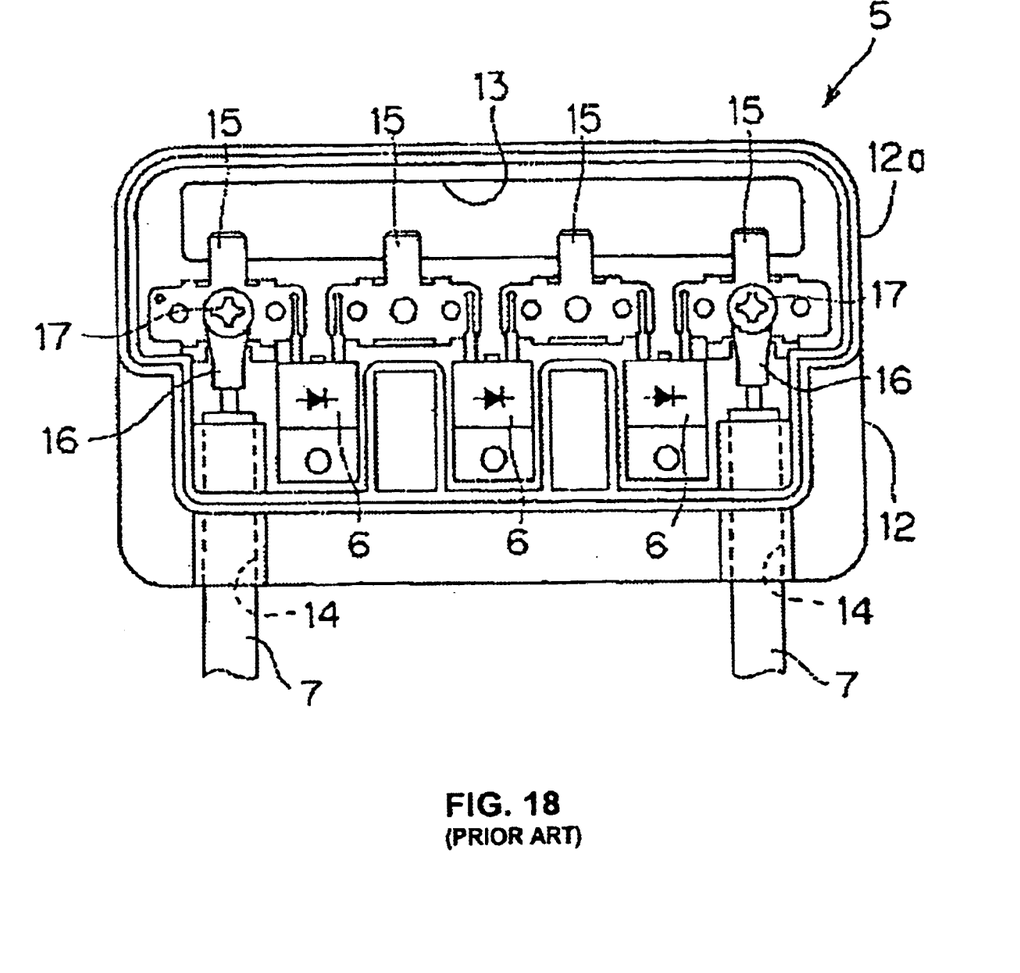
FIG. 18 is a plan view showing a conventional terminal box apparatus.

As shown in FIG. 18, the terminal box apparatus 5 has a box 12 formed by molding a synthetic resin. The box 12 has an approximately rectangular body 12a having an accommodation concavity and open on its upper surface. The box 12 also has a plate-shaped cover (not shown) mounted on an upper surface of the body 12a to close the accommodation concavity.

With reference to FIG. 18, a wiring hole 13 serving as a frame insertion hole is formed on the body 12a along one edge of a bottom surface of the body 12a. Cable insertion holes (right and left ends in FIG. 18) 14 through which a pair of the output take-out module connection cables 7 is inserted respectively are formed on side walls of the body 12a at the other side of the bottom surface of the body 12a.

A plurality of terminal-fixing parts (not shown) is disposed in parallel at a part intermediate between the wiring hole 13 of the body 12a and the cable insertion holes 14, with the terminal-fixing parts (not shown in FIG. 18) projecting from the bottom surface of the body 12a in a right-to-left direction. A connection terminal 15 approximately T-shaped in a plan view is mounted on each terminal-fixing part by thermal crushing or the like. Side projected parts of the connection terminal 15 are projected in the right-to-left direction, whereas the central projected part thereof is projected toward the wiring hole 13.

An end of each of a plurality of connection elements (lead frame, not shown) connected to photoelectric conversion elements of the solar cell module 1 is inserted into the box 12 through the wiring hole 13 and soldered to the central projected part of the corresponding connection terminal 15.

The connection terminal 16 caulked to the end of the module connection cable 7 inserted through the cable insertion hole 14 is fastened to each of the connection terminals 15 at both ends of the box 12. The bypass diode 6 is soldered to projected parts of the adjacent connection terminals 15. As the bypass diode 6, a diode of mold type having a lead pin pulled to the outside is used. The lead pin is soldered to the projected parts. The bypass diodes 6 are connected in the direction reverse to parallel output voltages of the photoelectric conversion elements of each of the solar cell modules 1. Thereby the bypass diodes 6 have a bypass function.

In recent years, the solar cell 3 tends to be large, and electric current produced by the solar cell 3 also tends to be high. If the solar cell 3 is covered with leaves, the bypass diode 6 of the bypass circuit generates heat and its temperature rises. The higher output current is, the higher the temperature of the bypass diode 6 becomes. Thus, there is a possibility that the bearing life of peripheral component parts decreases.

SUMMARY OF THE INVENTION

The present invention has been made in view of the above-described problem. Accordingly, it is an object of the present invention to provide a terminal box apparatus for a solar cell module having improved durability and reliability for long-term service.

To achieve the object, in various exemplary embodiments, there is provided a terminal box apparatus for a solar cell module having a box mounted on the solar cell module; a plurality of connection terminals disposed inside the box and connected to a plurality of connection elements extending from photoelectric conversion elements of the solar cell module; a pair of output take-out module connection cables having one end thereof connected to one of the connection terminals and other end thereof pulled out of the box respectively; and a plurality of bypass rectifying elements extending across the adjacent connection terminals respectively.

Each of the bypass rectifying elements has a body and a pair of parallel lead plates disposed on an upper and lower surfaces of the body of the rectifying element and extended in opposite directions; each of the lead plates has a wide heat radiation part at an extended side thereof; and each of the heat radiation parts is soldered to a heat radiation part receiving piece projected from each of the connection terminals in a layered state.

In a terminal box apparatus for a solar cell module in various exemplary embodiments, one of the lead plates has a thickness less than 0.1 mm; and in the neighborhood of a portion in which the body of the rectifying element is connected to the other of a pair of the lead plates, a slit-shaped notch is formed in a direction vertical to an extension direction of the lead plate by cutting the lead plate alternately from both side surfaces thereof in the extension direction.

In a terminal box apparatus for a solar cell module in various exemplary embodiments, a heat radiation plate is interposed between the heat radiation part of the lead plate and the heat radiation part receiving piece of the connection terminal.

In a terminal box apparatus for a solar cell module in various exemplary embodiments, the connection terminal has a heat radiation surface part extended to a mounting surface of the box that is mounted on the solar cell module.

In a terminal box apparatus for a solar cell module in various exemplary embodiments, a metal plate is mounted at a portion of a mounting surface of the box, corresponding to a bypass rectifying element-mounting position, to be mounted on the solar cell module.

In a terminal box apparatus for a solar cell module in various exemplary embodiments, a surface of the box in contact with an air layer is made of metal, with the box installed on the solar cell module.

In a terminal box apparatus for a solar cell module in various exemplary embodiments, an entire outer surface of the box is covered with a metal cover.

In a terminal box apparatus for a solar cell module in various exemplary embodiments, the metal has superior heat radiation property.

In various exemplary embodiments, there is provided a terminal box apparatus for a solar cell module having a box mounted on the solar cell module; a plurality of connection terminals disposed inside the box and connected to a plurality of connection elements extending from photoelectric conversion elements of the solar cell module; a pair of output take-out module connection cables having one end thereof connected to one of the connection terminals and other end thereof pulled out of the box respectively; and a plurality of bypass rectifying elements extending across the adjacent connection terminals respectively.

The box includes a main box accommodating a pair of the output take-out module connection cables and a plurality of subsidiary boxes provided for the bypass rectifying elements respectively disposed across the adjacent connection terminals; and the connection terminals of the main box and the connection terminals of the subsidiary boxes are sequentially connected to each other with connection elements disposed at a side of the solar cell module.

In various exemplary embodiments, there is provided a terminal box apparatus for a solar cell module having a box mounted on the solar cell module; a plurality of connection terminals disposed inside the box and connected to a plurality of connection elements extending from photoelectric conversion elements of the solar cell module; a pair of output take-out module connection cables having one end thereof connected to one of the connection terminals and other end thereof pulled out of the box respectively; and a plurality of bypass rectifying elements extending across the adjacent connection terminals respectively. The bypass rectifying elements are disposed in a zigzag pattern.

In a terminal box apparatus for a solar cell module in various exemplary embodiments, heat insulation partitioning walls for partitioning the adjacent bypass rectifying elements from each other are provided.

DETAILED DESCRIPTION OF PREFERRED EMBODIMENTS

The embodiments of the present invention will be described below with reference to drawings.

First Embodiment

Figure 1:
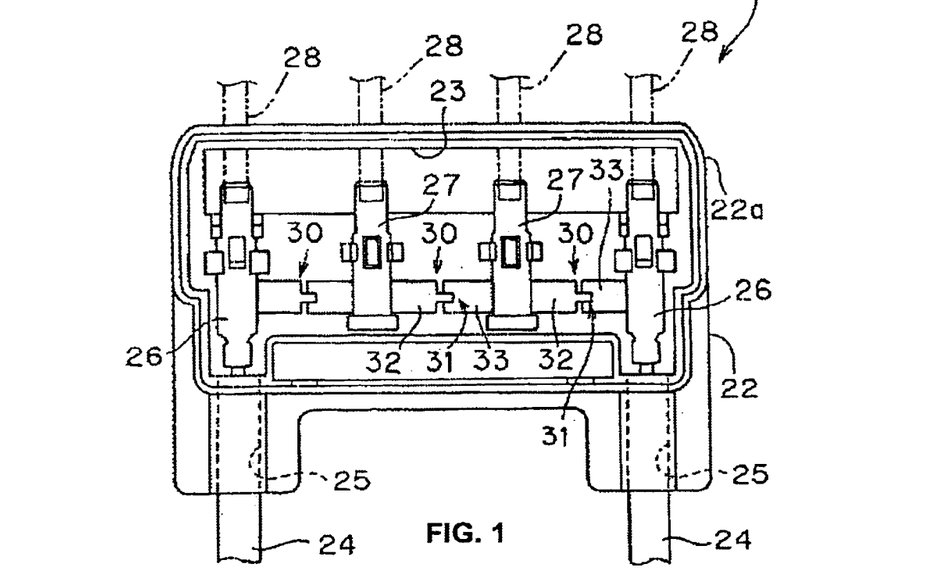
FIG. 1 is a schematic plan view showing a terminal box apparatus according to a first embodiment of the present invention.

FIG. 1 shows a terminal box apparatus 20 for a solar cell module. As described previously, the terminal box apparatus 20 is disposed on the rear surface of the body of a solar cell module having solar cells (cell group) formed on its surface. The solar cells serve as photoelectric conversion elements electrically connected in series.

The terminal box apparatus 20 has a box 22 formed by molding a synthetic resin. The box 22 has an approximately rectangular body 22a having an accommodation concavity and open on its upper surface. The box 22 also has a plate-shaped cover (not shown) mounted on an upper surface of the body 22a to close the accommodation concavity.

Similarly to the conventional construction, the lower surface of the body 22a of the terminal box apparatus 20 is bonded to the rear surface of the body of the solar cell module with an adhesive agent. For waterproofing, resistance to moisture, heat radiation, and prevention of dew condensation, the cover is bonded to the body 22a with silicon filled into the accommodation concavity.

A wiring hole 23 serving as a frame insertion hole is formed on the body 22a along one edge of a bottom surface of the body 22a. Cable insertion holes (right and left ends in FIG. 1) 25 through which a pair of the output take-out module connection cables 24 is inserted respectively are formed on side walls of the body 22a at the other side of the bottom surface of the body 22a.

A plurality of terminal-fixing parts (not shown) is disposed in parallel at a part intermediate between the wiring hole 23 of the body 22a and the cable insertion holes 25. The terminal-fixing parts (not shown) project from the bottom surface of the body 22a in a right-to-left direction. Connection terminals 26 and 27 are fixed to terminal-fixing parts. In the first embodiment, core wire portions of the right and left module connection cables 24 are caulked to the right and left connection terminals 26.

An end of each of a plurality of lead frames 28, serving as connection elements, extending from photoelectric conversion elements of the solar cell module 1 is inserted into the box 22 through the wiring hole 23 and soldered to the end of the corresponding connection terminals 26 and 27.

Figure 2:
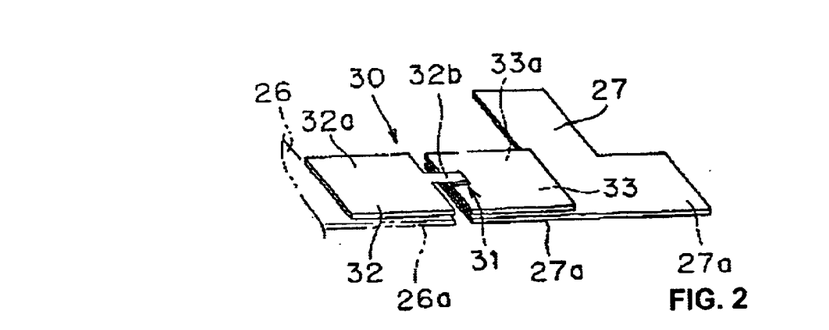
FIG. 2 is a perspective view showing main parts of the terminal box apparatus shown in FIG. 1.
Figure 3:
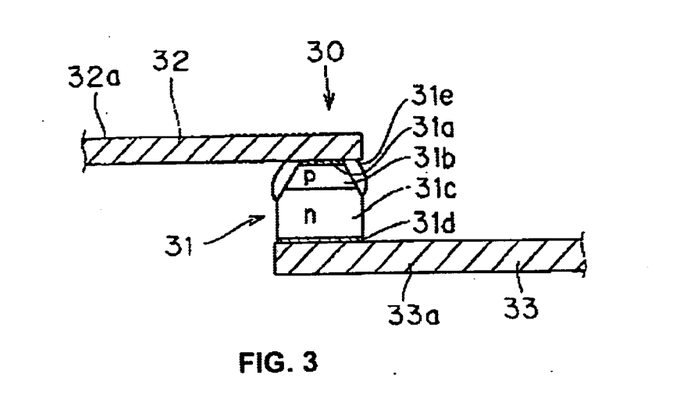
FIG. 3 is a sectional view showing a part of the main parts of the terminal box apparatus shown in FIG. 2.

As shown in FIGS. 2 and 3, bypass diodes 30, serving as bypass rectifying elements, to be connected in parallel to the photoelectric conversion element of the solar cell module extend across the adjacent connection terminals 26 and 27 respectively.

That is, the bypass diode 30 has a chip-shaped bare chip diode 31 serving as the body of the rectifying element and a pair of parallel metal lead plates 32 and 33 disposed on upper and lower surfaces of the bare chip diode 31 respectively and extended in opposite directions. The lead plates 32 and 33 have wide rectangular heat radiation parts 32a and 33a at an extended side thereof respectively. The upper lead plate 32 has a narrow projected part 32b at the central portion in the widthwise direction thereof. The heat radiation part 33a of the lower lead plate 33 is rectangular.

As the bare chip diode 31, a mesa-type bare chip diode passivated with glass is used. The bare chip diode 31 has an anode electrode 31a, a p-type region 31b, an n-type region 31c, and a cathode electrode 31d layered vertically sequentially. A glass film 31e serving as a protection film is formed on the periphery of side surfaces of the laminate of the bare chip diode 31. The protection film improves resistance to environment. The anode electrode 31a at the side of the p-type region 31b is soldered to the projected part 32b of the lead plate 32. The cathode electrode 31d at the side of the n-type region 31c is soldered to an end portion of the lead plate 33.

Rectangular opposed heat radiation part receiving pieces 26a and 27a having the same shape and size as those of the heat radiation parts 32a and 33a are projectingly formed on the adjacent connection terminals 26 and 27 respectively. As shown in FIG. 2, in the bypass diode 30, the heat radiation part 32a of the lead plate 32 and the heat radiation part 33a of the lead plate 33 are soldered to the heat radiation part receiving pieces 26a and 27a in a layered state respectively. The terminal box apparatus 20 is used similarly to the terminal box apparatus 5.

In the terminal box apparatus 20 having the above-described construction, heat generated in the bare chip diode 31 can be radiated through the wide heat radiation parts 32a and 33a of the lead plates 32 and 33 and the heat radiation part receiving pieces 26a and 27a of the connection terminals 26 and 27 having the same shape and size as those of the heat radiation parts 32a and 33a of the lead plates 32 and 33. Thus, it is possible to effectively prevent the heat from not being radiated partly and radiate the heat in a wide range. That is, it is possible to improve the radiation effect. Therefore, it is possible to improve the durability of the bare chip diode 31 and other component parts and provide the bare chip diode 31 and the solar cell module 1 having reliability for long-term service.

The heat radiation part receiving piece 26a is inserted through the cable insertion hole 25 of each connection terminal 26 caulked to the module connection cable 24 by folding and then unfolding it. As another method, the connection terminal 26 is caulked to an end of the core wire of the module connection cable 24 inserted through the cable insertion hole 25. It is possible to adopt a conventional method of fastening the connection terminal 26 with a screw to the connection terminal 27 mounted inside the body 22a.

Figure 4:
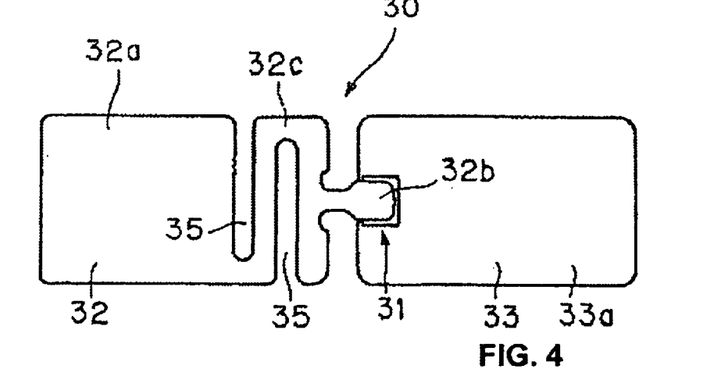
FIG. 4 is a plan view showing main parts of a terminal box apparatus according to a second embodiment of the present invention.

To enhance the heat radiation effect of the lead plates 32 and 33 and connection terminals 26 and 27, it is preferable to form them of a material, for example, copper (preferably, oxygen-free copper) or a copper alloy having a high thermal conductivity Second Embodiment FIG. 4 shows the bypass diode 30 of a second embodiment. Constituent parts of the second embodiment similar to those of the first embodiment are denoted by the same reference numerals as those of the first embodiment and description thereof are omitted herein.

In the second embodiment, in the neighborhood of the projected part 32b of the lead plate 32 of the bypass diode 30, two deep slit-shaped notches 35 are formed in a direction (widthwise) perpendicular to the extension direction of the lead plate 32 by cutting the lead plate 32 from both side surfaces thereof in the extension (longitudinal) direction thereof to form a zigzag part 32c.

A rectangular part not having the notch 35 is constructed as the heat radiation part 32a. The lead plate 32 is made of metal and has a small thickness less than 0.1 mm. Similarly to the first embodiment, in the bypass diode 30, the heat radiation parts 32a and 33a are soldered in a layered state to the heat radiation part receiving pieces 26a and 27a formed projectingly on the adjacently disposed the connection terminals 26 and 27 respectively.

Therefore, the second embodiment has effect similar to that of the first embodiment. Because the zigzag part 32c has a flexible construction, a temperature change-caused stress is relievedly applied to the connection portion between the bare chip diode 31 and the lead plate 32 as well as the lead plate 33. Thus, it is possible to effectively prevent separation of the connection portion between the bare chip diode 31 and the lead plate 32 as well as the lead plate 33.

In the second embodiment, the projected part 32b and the zigzag part 32c are formed at the side of the lead plate 32 connected to the p-type region 31b of the bare chip diode 31. Instead, the projected part 32b and the zigzag part 32c may be formed at the side of the lead plate 33 connected to the n-type region 31c.

Third Embodiment

Figure 5:
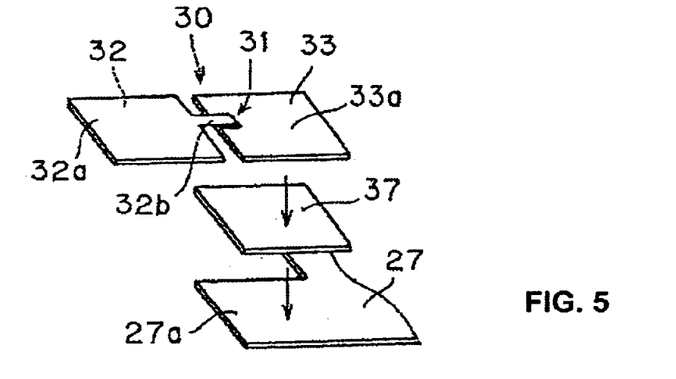
FIG. 5 is an exploded perspective view showing main parts of a terminal box apparatus according to a third embodiment of the present invention.

FIG. 5 shows a third embodiment. Constituent parts of the third embodiment similar to those of the first embodiment are denoted by the same reference numerals as those of the first embodiment and description thereof are omitted herein.

In the third embodiment, the heat radiation parts 32a and 33a of the lead plates 32 and 33 of the bypass diode 30 are soldered to the heat radiation part receiving pieces 26a and 27a of the connection terminals 26 and 27 respectively, with a rectangular heat radiation metal plate 37 having almost the same shape and size as those of the heat radiation parts 32a and 33a interposed therebetween.

Therefore, the third embodiment has effect similar to that of the first embodiment and improved heat radiation effect owing to the increase of heat capacity caused by the provision of the heat radiation plate 37.

Because the heat radiation plate 37 exhibits heat radiation effect, it is possible to make the connection terminals 26 and 27 thin and improve operability in soldering the connection terminals 26 and 27 and lead frames 28 to each other.

The heat radiation plate 37 is interposed between the heat radiation part 32a and the heat radiation part receiving piece 26a and between the heat radiation part 33a and the heat radiation part receiving piece 27a. But the heat radiation plate 37 may be interposed between the heat radiation part 32a and the heat radiation part receiving piece 26a or between the heat radiation part 33a and the heat radiation part receiving piece 27a.

Fourth Embodiment

Figure 6:
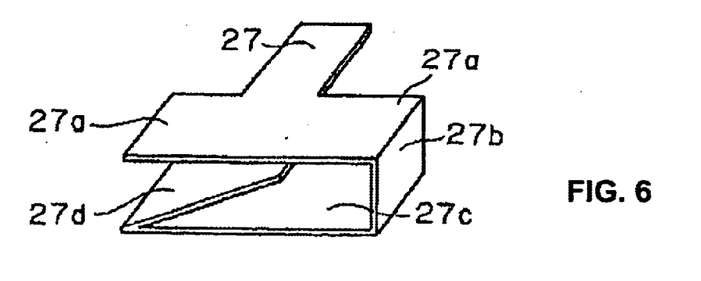
FIG. 6 is an exploded perspective view showing a connection terminal according to a fourth embodiment of the present invention.
Figure 7:
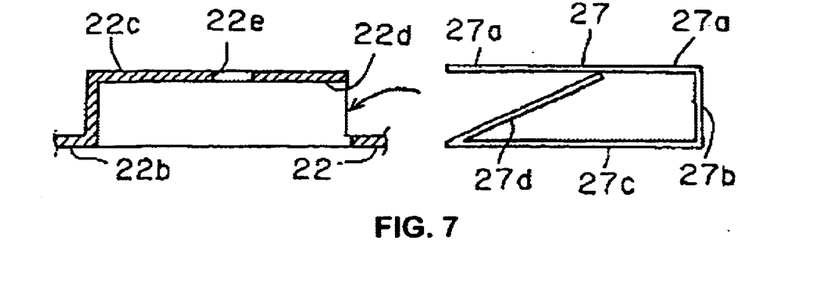
FIG. 7 is an explanatory view for mounting the terminal box apparatus shown in FIG. 6 on a solar cell module.
Figure 8:
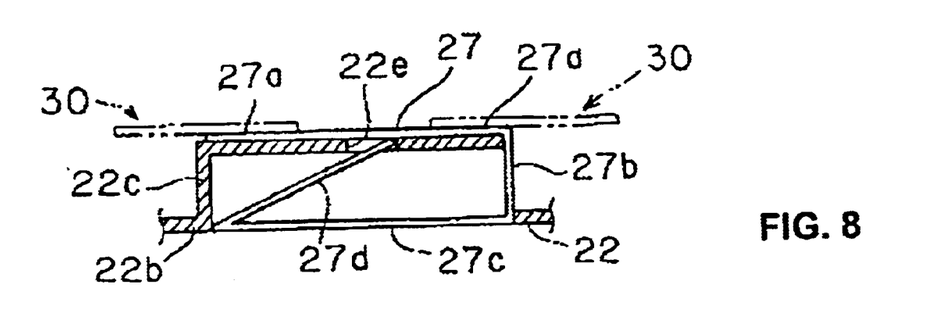
FIG. 8 is an explanatory view for mounting the terminal box apparatus shown in FIG. 6 on the solar cell module.

FIGS. 6 through 8 show a fourth embodiment. Constituent parts of the fourth embodiment similar to those of the first embodiment are denoted by the same reference numerals as those of the first embodiment and description thereof are omitted herein.

In the fourth embodiment, the connection terminal 27 has a leg part 27b extended from an edge of one heat radiation part receiving piece 27a thereof by bending the leg part 27b toward a mounting surface 22b of the box 22 that is mounted on the solar cell module. The connection terminal 27 further includes a heat radiation surface part 27c bent from the lower end of the leg part 27b, with the heat radiation surface part 27c parallel with the heat radiation part receiving piece 27a. The connection terminal 27 further includes a spring piece part 27d formed by bending the heat radiation surface part 27c at an end thereof toward the heat radiation part receiving piece 27a.

A mounted state shown in FIG. 8 is obtained by inserting the heat radiation surface part 27c and the spring piece part 27d into the box 22 from an insertion opening 22d at one side of a terminal-fixing part 22c of the box 22. In the mounted state, the upper end of the spring piece part 27d is locked to a locking part 22e of the terminal-fixing part 22c because the spring piece part 27d returns to the original state elastically. In the mounted state, the heat radiation surface part 27c is exposed to the outside at the side of the mounting surface 22b of the box 22.

Similarly to the first and second embodiments, the lead plates 32 and 33 of the bypass diode 30 are soldered to each heat radiation part receiving piece 27a in a layered state, with the lead plates 32 and 33 striding over the heat radiation part receiving pieces 26a and 27a of the connection terminals 26 and 27.

Therefore, the fourth embodiment has effect similar to that of the first embodiment. Further, because the heat radiation surface part 27c of the connection terminal 27 is exposed to the outside at the rear surface of the solar cell module, heat radiation property of the body of the solar cell module can be improved through the heat radiation surface part 27c. Thus, it is possible to improve the heat radiation effect.

Fifth Embodiment

Figure 9:
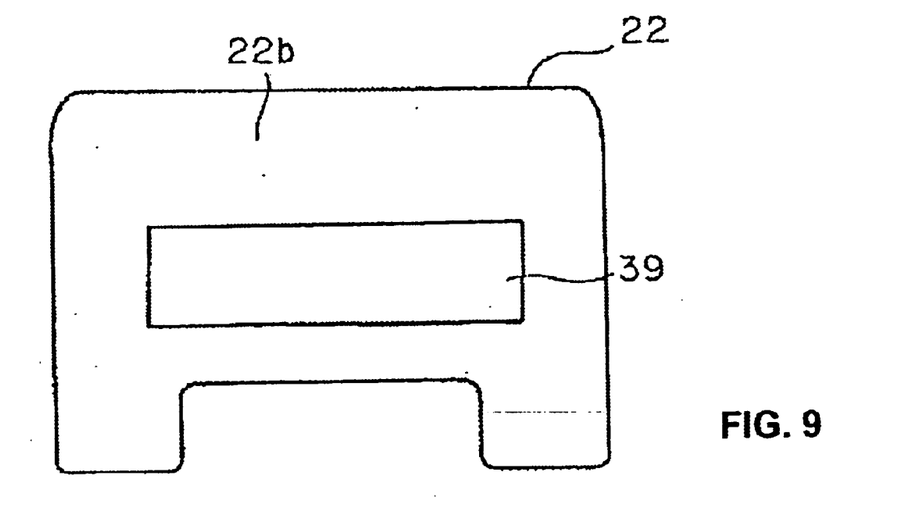
FIG. 9 is a bottom view showing a box of a terminal box apparatus according to a fifth embodiment of the present invention.

FIG. 9 shows the box 22 of a fifth embodiment. Constituent parts of the fifth embodiment similar to those of the first embodiment are denoted by the same reference numerals as those of the first embodiment and description thereof are omitted herein.

In the fifth embodiment, a long and narrow metal plate 39 is mounted at a portion of the mounting surface 22b of the box 22, corresponding to a bypass diode-mounting position, to be mounted on the solar cell module.

Figure 10:
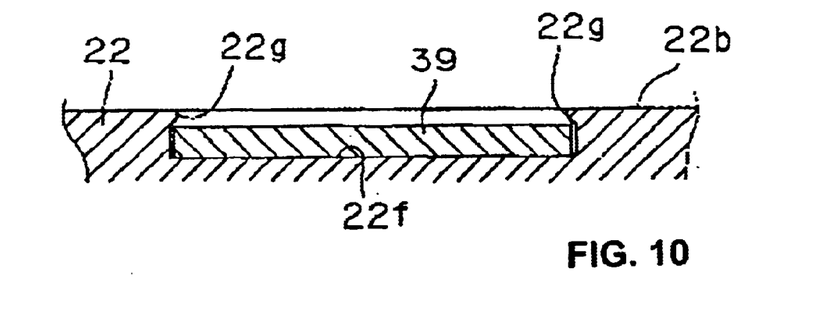
FIG. 10 is a sectional view showing main parts of a modification of the fifth embodiment.

The metal plate 39 is bonded to the mounting surface 22b with an adhesive agent. As another method, the metal plate 39 is embedded in the box 22 when the box 22 is formed by integral molding. As still another method, as shown in FIG. 10, the metal plate 39 is unremovably held on a projection formed on the edge of an opening, with the metal plate 39 fitted in a fit-in concavity 22f formed on the mounting surface 22b.

Therefore, the fifth embodiment has effect similar to that of the first embodiment. Further, the heat radiation property of the body of the solar cell module can be improved through the metal plate 37 mounted on the portion of the mounting surface 22b of the box 22, corresponding to the bypass diode-mounting position, to be mounted on the solar cell module. Thus, it is possible to improve the heat radiation effect.

Sixth Embodiment

Figure 11:
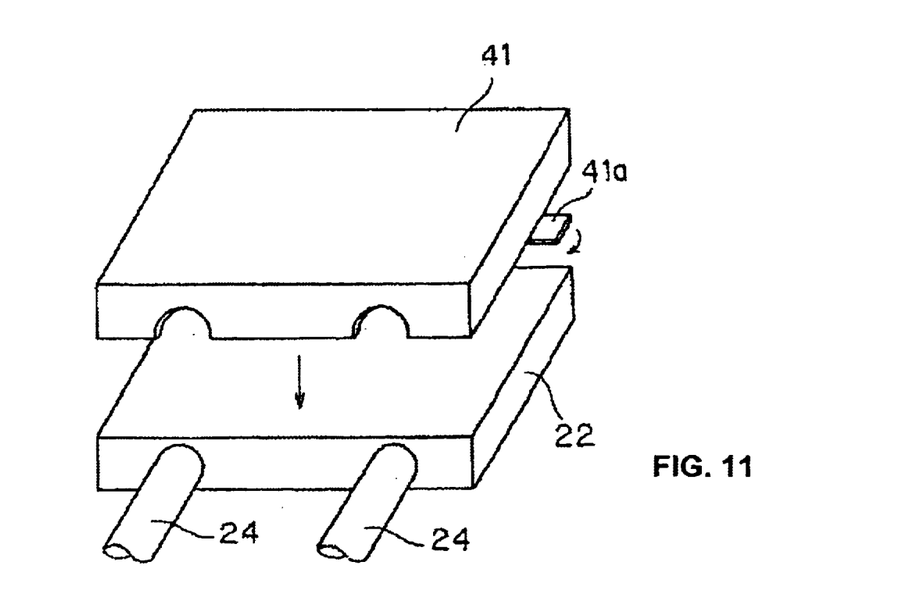
FIG. 11 is an exploded perspective view showing a sixth embodiment of the present invention.

FIG. 11 shows the box 22 of a sixth embodiment. Constituent parts of the sixth embodiment similar to those of the first embodiment are denoted by the same reference numerals as those of the first embodiment and description thereof are omitted herein.

The construction of connecting the connection terminals 26 and 27 provided in the box 22 and the bypass diodes 30 is similar to that of the first through fifth embodiments.

In the sixth embodiment, the surface of the box 22 in contact with an air layer is covered with a metal cover 41, with the box 22 installed on the rear surface of the solar cell module. The cover 41 is made of a material, for example, "Kobe Honetsu" having a superior heat radiation emissivity over other typical steels. The cover 41 can be mounted on the box 22 by bending a locking piece 41a thereof disposed at both side surfaces to the mounting surface 22b of the box 22.

Therefore, the sixth embodiment has effect similar to that of the first through fifth embodiment. Further, it is possible to radiate the heat inside the box 22 to the outside through the metal cover 41 installed on the surface thereof and improve heat radiation property. Further, the cover 41 is made of a material having superior heat radiation emissivity and/or dissipation properties. Thus, the sixth embodiment provides improved heat radiation effect.

In the sixth embodiment, the construction of mounting the cover 41 on the box 22 has been described. The cover to be mounted on an upper open portion of the body 22a of the box 22 may be made of metal. The upper surface of the box 22 on which the cover 41 is mounted may be made of metal.

Seventh Embodiment

Figure 12:
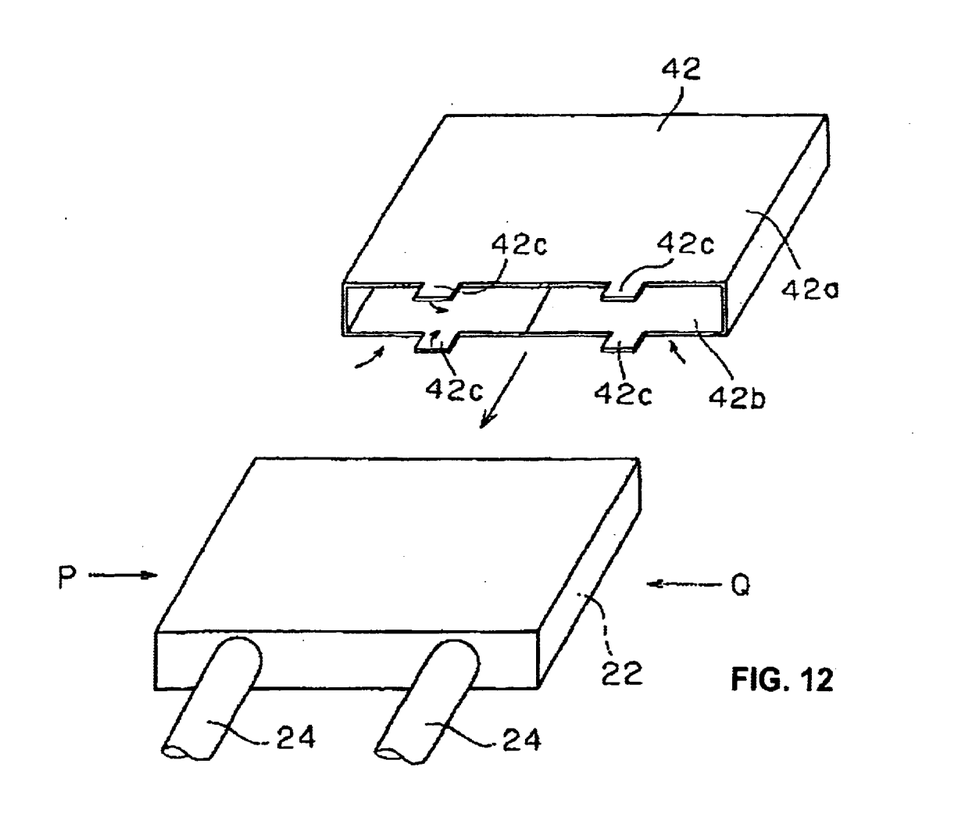
FIG. 12 is an exploded perspective view showing a seventh embodiment of the present invention.

FIG. 12 shows the box 22 of a seventh embodiment. Constituent parts of the seventh embodiment similar to those of the first embodiment are denoted by the same reference numerals as those of the first embodiment and description thereof are omitted herein.

The construction of connecting the connection terminals 26 and 27 provided in the box 22 and the bypass diodes 30 is similar to that of the first through fifth embodiments.

In the seventh embodiment, the entire outer surface of the box 22 is covered with a metal cover 42. Similarly to the sixth embodiment, the cover 42 is made of a material, for example, "Kobe Honetsu" having superior heat radiation properties. The cover 42 can be mounted on the box 22 by bending a locking piece 42c disposed on one edge of a ceiling wall surface 42a and a bottom wall surface 42b along the side surface of the box 22.

A wiring hole corresponding to the wiring hole 23 of the box 22 is formed on the bottom wall surface 42b. The bottom wall surface 42b has a two-piece construction. In mounting the cover 42 on the box 22, it is possible to prevent the cover from interfering with the lead frame 28 by bending the bottom wall surface 42b having the two-piece construction toward the mounting surface 22b.

Therefore, the seventh embodiment has effect similar to that of the first through fifth embodiment. Further, it is possible to radiate the heat inside the box 22 to the outside through the metal cover 42 installed on the entire outer surface thereof and improve heat radiation property.

Further, the cover 41 is made of a material having superior heat radiation properties. Thus, the seventh embodiment provides improved heat radiation effect.

In the seventh embodiment, the cover 42 is mounted on the box 22 at the side thereof opposite to the side where the module connection cable 24 is disposed. Instead, the cover 42 may be installed on the box 22 sideways, namely, in directions shown with arrows P and Q. In this case, it is unnecessary for the bottom wall surface 42b to have the two-piece construction.

Eighth Embodiment

Figure 13:
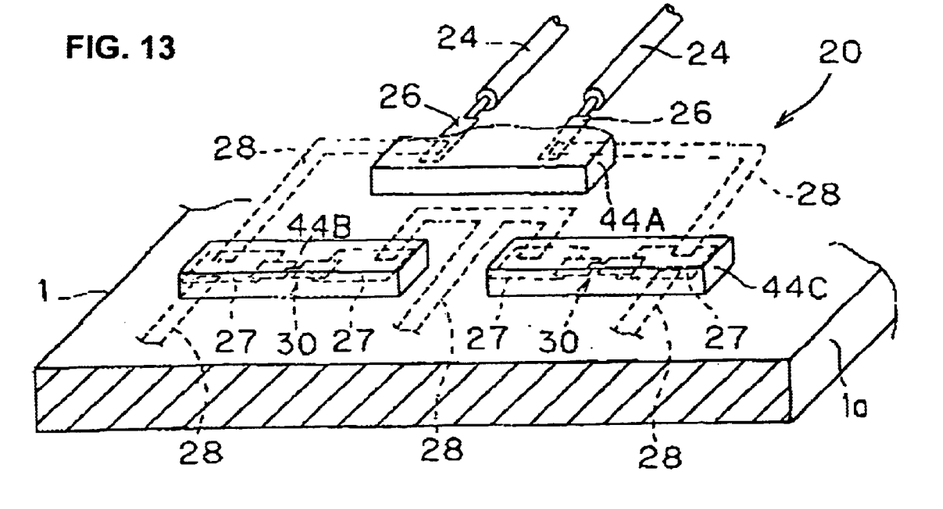
FIG. 13 is a perspective view showing main parts of an eighth embodiment of the present invention.

FIG. 13 shows an eighth embodiment. Constituent parts of the eighth embodiment similar to those of the first embodiment are denoted by the same reference numerals as those of the first embodiment and description thereof are omitted herein.

In the eighth embodiment, the box 22 includes a main box 44A accommodating the connection terminals 26 connected to a pair of module connection cables 24 respectively and a plurality of subsidiary boxes 44B and 44C provided for the bypass diodes 30 respectively disposed across the adjacent connection terminals 27. The main box 44A and the subsidiary boxes 44B and 44C are spaced at certain intervals.

The connection terminals 26 of the main box 44A and the connection terminals 27 of the subsidiary boxes 44B and 44C are sequentially connected to each other with the lead frames 28 disposed at the side of the solar cell module 1.

According to the eighth embodiment, the subsidiary boxes 44B and 44C are provided to respectively accommodate the bypass diodes 30 serving as the heat source. Thus, the heat source can be scattered and the heat radiation effect can be improved. Therefore, it is possible to improve the durability of the bypass diodes 30 and provide the solar cell module 1 having reliability for long-term service.

Because the main box 44A and the subsidiary boxes 44B and 44C are spaced at certain intervals, the eighth embodiment has an advantage of improving the heat radiation effect to a higher extent.

By appropriately adopting the construction of the first through fifth embodiments as the construction of connecting the connection terminals 27 and the corresponding bypass diodes 30 to each other, the same effect as that of the first through fifth embodiments can be displayed in the eighth embodiment.

Ninth Embodiment

Figure 14:
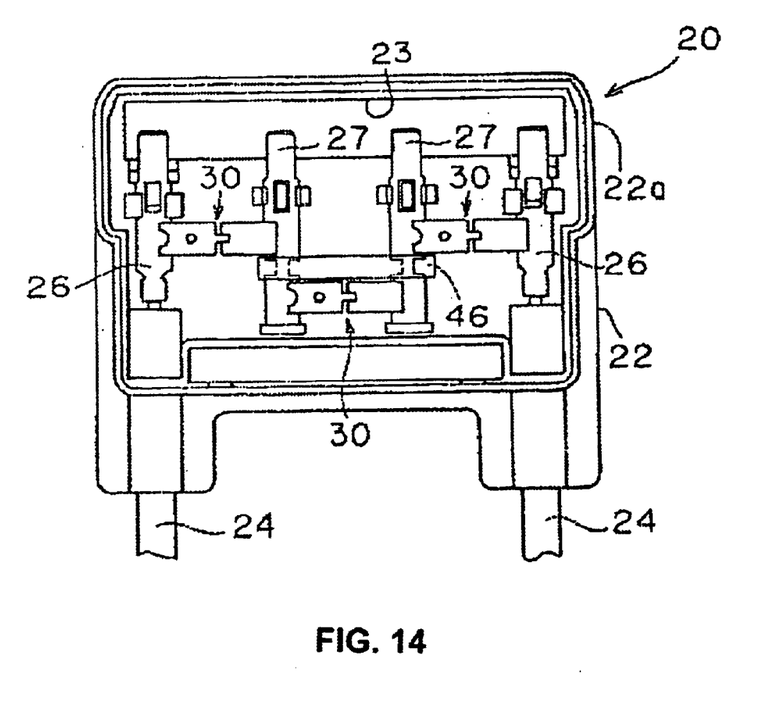
FIG. 14 is a schematic plan view showing a ninth embodiment of the present invention.

FIG. 14 shows a ninth embodiment. Constituent parts of the ninth embodiment similar to those of the first embodiment are denoted by the same reference numerals as those of the first embodiment and description thereof are omitted herein.

In the ninth embodiment, the bypass diodes 30 are disposed by extending them across the adjacent connection terminals 26 and 27 not in a row in a right-to-left direction as shown in FIG. 1, but zigzag in the right-to-left direction as shown in FIG. 14.

Heat insulation partitioning walls 46 made of a resinous heat insulation material are erectly provided between the adjacent bypass diodes 30 to partition the adjacent bypass diodes 30 from each other.

In the ninth embodiment, the bypass diodes 30 serving as the heat source are scatteredly provided. Thus, it is possible to effectively prevent a temperature rise because there is no interference between the adjacent bypass diodes 30 and improve heat radiation effect owing to scattered disposition of the heat source. Therefore, it is possible to improve the durability of the bypass diodes 30 and provide the solar cell module 1 having reliability for long-term service.

The heat insulation partitioning walls 46 are also capable of preventing a temperature rise because there is no interference between the adjacent bypass diodes 30 and improving the heat radiation effect to a higher extent.

By appropriately adopting the construction of the first through seventh embodiments as the construction of connecting the connection terminals 27 and the bypass diodes 30 to each other, the same effect as that of the first through seventh embodiments can be displayed in the ninth embodiment.

In each of the first through ninth embodiments, the number of the bypass diodes 30, the number of the connection terminals 26 and 27, and the configuration thereof can be appropriately determined as necessary.

In the terminal box apparatus for the solar cell module in various exemplary embodiments, each of the bypass rectifying elements has the body and a pair of the parallel lead plates disposed on the upper and lower surfaces of the body of the bypass rectifying element and extended in opposite directions. Each of the lead plates has the wide heat radiation part at the extended side thereof. Each of the heat radiation parts is soldered to the heat radiation part receiving piece projected from each of the connection terminals in a layered state. Therefore, heat generated in the bypass rectifying element can be radiated through the wide heat radiation parts and the heat radiation part receiving pieces. Thus, it is possible to improve the radiation effect. Therefore, it is possible to improve the durability of the bypass rectifying element and the terminal box apparatus for the solar cell module having reliability for long-term service.

In the terminal box apparatus for the solar cell module in various exemplary embodiments, one of the lead plates has a thickness less than 0.1 mm. In the neighborhood of the portion in which the body of the bypass rectifying element is connected to the other of a pair of the lead plates, the slit-shaped notch is formed in the direction vertical to the extension direction of the lead plate by cutting the lead plate alternately from both side surfaces thereof in the extension direction. Because the portion of the lead plate where the notch is formed has a flexible construction, a temperature change-caused stress is relievedly applied to the connection portion between the body of the rectifying element and each of the lead plates. Thus, it is possible to effectively prevent separation of the connection portion between the rectifying element and each of the lead plates.

In the terminal box apparatus for the solar cell module in various exemplary embodiments, the heat radiation plate is interposed between the heat radiation part of the lead plate and the heat radiation part receiving piece of the connection terminal. Thus, it is possible to improve heat radiation effect owing to an increase of the heat capacity caused by the provision of the heat radiation plate.

In the terminal box apparatus for the solar cell module in various exemplary embodiments, the connection terminal has the heat radiation surface part extended to the mounting surface of the box that is mounted on the solar cell module.

In the terminal box apparatus for the solar cell module in various exemplary embodiments, the metal plate is mounted at the portion of the mounting surface of the box, corresponding to the bypass rectifying element-mounting position, to be mounted on the solar cell module. Therefore, the heat radiation property of the body of the solar cell module can be improved through the metal plate. Thus, it is possible to improve the heat radiation effect.

In the terminal box apparatus for the solar cell module in various exemplary embodiments, the surface of the box in contact with the air layer is made of metal, with the box installed on the solar cell module. Therefore, it is possible to radiate the heat inside the box to the outside through the metal cover installed on the surface thereof and improve heat radiation property.

In the terminal box apparatus for the solar cell module in various exemplary embodiments, the entire outer surface of the box is covered with a metal cover. Therefore, it is possible to radiate the heat inside the box to the outside through the metal cover installed on the entire outer surface thereof and improve heat radiation property.

In the terminal box apparatus for the solar cell module in various exemplary embodiments, the metal cover has superior heat radiation properties. Thus, it is possible to improve heat radiation property.

In the terminal box apparatus for the solar cell module in various exemplary embodiments, the box includes the main box accommodating a pair of the output take-out module connection cables and a plurality of the subsidiary boxes provided for the bypass rectifying elements respectively disposed across the adjacent connection terminals. The connection terminals of the main box and the connection terminals of the subsidiary boxes are sequentially connected to each other with the connection elements disposed at the side of the solar cell module. The subsidiary boxes are provided to respectively accommodate the bypass rectifying elements serving as the heat source. Thus, the heat source can be scattered and the heat radiation effect can be improved. Therefore, it is possible to improve the durability of the bypass rectifying elements and provide the solar cell module having reliability for long-term service.

In the terminal box apparatus for the solar cell module in various exemplary embodiments, the bypass rectifying elements are disposed in a zigzag pattern. Thus, it is possible to improve heat radiation effect owing to scattered disposition of the heat source. Therefore, it is possible to improve the durability of the bypass rectifying elements and provide the solar cell module having reliability for long-term service.

In the terminal box apparatus for the solar cell module in various exemplary embodiments, the heat insulation partitioning walls for partitioning the adjacent bypass rectifying elements from each other are provided. The heat insulation partitioning walls are capable of preventing a temperature rise because there is no interference between the adjacent bypass rectifying means and improving the heat radiation effect to a higher extent.

While this invention has been described in conjunction with the specific embodiments above, it is evident that many alternatives, combinations, modifications, and variations are apparent to those skilled in the art. Accordingly, the exemplary embodiments of this invention, as set forth above are intended to be illustrative, and not limiting. Various changes can be made without departing from the spirit and scope of this invention.

What is claimed is:

1. A solar cell module terminal box apparatus comprising:
    a box mounted on a solar cell module;
    a plurality of photoelectric conversion elements of said solar cell module;
    a plurality of connection terminals disposed inside said box and connected to a plurality of connection elements extending from said photoelectric conversion elements;
    a pair of output take-out module connection cables having one end thereof connected to one of said connection terminals and other end thereof pulled out of said box respectively; and
    a plurality of bypass rectifying elements extending across said adjacent connection terminals respectively, wherein
        each of said bypass rectifying elements has a body, said body having first and second surfaces, and a pair of parallel lead plates disposed on said first and second surfaces said parallel lead plates extending in opposite directions;
        each of both said parallel lead plates has a wide heat radiation part at an extended side thereof, forming a plurality of heat radiation parts; and
        each of said heat radiation parts is respectively soldered to a heat radiation part receiving piece projecting from each of said connection terminals in a layered state.

2. The solar cell module terminal box apparatus according to claim 1, wherein
    a first of said parallel lead plates has a thickness less than 0.1 mm; and
    a second lead plate of said parallel lead plates has a slit-shaped notch formed in a direction perpendicular to an extension direction of said second lead plate by cutting said second lead plate alternately from both side surfaces thereof in said extension direction, said slit-shaped notch being near where said body of said each bypass rectifying element connects to the second lead plate.

3. The solar cell module terminal box apparatus according to claim 1, wherein a heat radiation plate is interposed between said heat radiation part of said parallel lead plates and said heat radiation part receiving piece of said connection terminal.

4. The solar cell module terminal box apparatus according to claim 1, wherein said connection terminal has a heat radiation surface part extended to a mounting surface of said box mounted on said solar cell module.

5. The solar cell module terminal box apparatus according to claim 1, wherein a metal plate is mounted at a portion of a mounting surface of said box, corresponding to a bypass rectifying element-mounting position for said box to be mounted on said solar cell module.

6. The solar cell module terminal box apparatus according to claim 1, wherein a surface of said box in contact with an air layer is made of metal, with said box installed on said solar cell module.

7. The solar cell module terminal box apparatus according to claim 1, wherein an entire outer surface of said box is covered with a metal cover.

8. The solar cell module terminal box apparatus according to claim 6, wherein said metal has superior heat radiation emissivity over typical steels.

9. A solar cell module terminal box apparatus comprising:

a box mounted on a solar cell module;

a plurality of photoelectric conversion elements of said solar cell module;

a plurality of connection terminals disposed inside said box and connected to a plurality of connection elements extending from said photoelectric conversion elements;

a pair of output take-out module connection cables each having a first end thereof connected to one of said connection terminals and a second end thereof pulled out of said box respectively; and a plurality of bypass rectifying elements respectively extending across said connection terminals, wherein said box includes a main box accommodating a pair of said output take-out module connection cables and a plurality of subsidiary boxes provided for said bypass rectifying elements respectively disposed across said adjacent connection terminals; and said connection terminals of said main box and said connection terminals of said subsidiary boxes are sequentially connected to each other with connection elements disposed at a side of said solar cell module.

10. A solar cell module terminal box apparatus comprising:

a box mounted on said solar cell module;

a plurality of photoelectric conversion elements of said solar cell module;

a plurality of connection terminals disposed inside said box and connected to a plurality of connection elements extending from said photoelectric conversion elements;

a pair of output take-out module connection cables each having a first end thereof connected to one of said connection terminals and a second end thereof pulled out of said box respectively; and a plurality of bypass rectifying elements extending across said adjacent connection terminals respectively, wherein said bypass rectifying elements are disposed in a zigzag pattern.

11. The solar cell module terminal box apparatus according to claim 10, wherein heat insulation partitioning walls partition said adjacent bypass rectifying elements from each other.

12. The solar cell module terminal box apparatus according to claim 7, wherein said metal has superior heat radiation emissivity over typical steels.

* * * * *